United States Patent Office 3,520,714
Patented July 14, 1970

3,520,714
METHOD OF MAKING A TACK-FREE SURFACE COATING UTILIZING HIGH ENERGY RADIATION

Lewis S. Miller, Bellevue, Wash., assignor to Weyerhaeuser Company, Tacoma, Wash., a corporation of Washington
No Drawing. Filed Dec. 28, 1966, Ser. No. 605,168
Int. Cl. B44d 1/50
U.S. Cl. 117—62.2    9 Claims

ABSTRACT OF THE DISCLOSURE

A process of making a firm, tack-free polymer coating on a surface using high energy radiation by coating the surface with a liquid polymerizable composition, replacing the atmosphere surrounding the coating with an atmosphere of polymerizable monomer wholly in the vapor phase, and exposing the coating to high energy radiation sufficient to polymerize the coating and polymerize the monomeric compound in the surface of the coating.

CROSS-REFERENCES

This application is related to application Ser. No. 421,643 filed Dec. 28, 1964, and assigned to the assignee of the present application, now abandoned.

BACKGROUND OF THE INVENTION

This invention relates to a new method for curing surface coatings of a monomer or a polymer dissolved in a monomer to a firm, tack-free condition by means of high energy ionizing radiation to give surface coatings having improved characteristics without changing desirable properties of the bulk film or its ability to adhere to the substrate.

It is well-known that ionizing radiation can be used to polymerize organic materials on many different substrates. In many cases, however, the top surface of the coating remains liquid and tacky, even though the body of the coating is cured. This tackiness or retardation of polymerization at the surface is caused by the presence of oxygen in the air reacting with the propagating molecular species in the liquid. This has been prevented by the use of a completely inert atmosphere above the coating which excludes the contact of oxygen with the surface coating. Other prior art methods of obtaining cure of catalyzed surface coatings on polymer substrates include: (1) incorporation of a wax or related material into the polymer coating, which wax comes to the surface and prevents oxygen penetration during the cure by high energy radiation, (2) formulation to include molecular species which cure or cross-link by mechanisms other than radiation on standing several hours or more, and (3) covering the surface of the coating with an inert film during radiation curing. These methods all present some difficulty either in that the time required is impractical, difficult to perform commercially, or expensive to employ in production.

Methods are also known in the prior art for the radiation of solids in the presence of gaseous monomers for the purpose of grafting the monomer to the polymer, though not for the express purpose of obtaining tack-free coatings. For example, see British Pat. No. 850,446 and U.S. Pat. Nos. 3,113,896 and 3,119,707.

SUMMARY

The present invention differs from the prior art in that the non-gaseous substrate onto which is to be grafted a monomer is not a polymer, but a liquid polymerizable monomer or a solution of polymer in monomer. The invention comprises, in its broadest aspects, a process of coating a surface with a liquid composition of an organic polymer or a solution of polymer in monomer, replacing essentially all of the oxygen in the atmosphere surrounding the coating with an atmosphere of polymerizable monomer wholly in the vapor phase, and exposing the coating to high energy radiation sufficient to cause polymerization of the substrate coating and graft polymerization of the vapor phase monomeric compound onto the substrate coating. The gaseous monomer dissolves to some extent in the liquid surface coating resulting in a degree of co-polymerization with the surface liquid. This results in a coating having a surface co-polymer composition including some of the gaseous monormer so that the physical and chemical properties of the coating are not identical to a similar coating cured, for example, by means of inert gas.

DETAILED DESCRIPTION

Substrate materials which may be used in the process of this invention may include any number of materials, such as paper, wood, or metal. Specifically, wood in the form of lumber, veneer, plywood, particleboard, and hardboard; and metals such as aluminum, may be used.

The liquid composition coated on the surface of the substrate is a polymerizable organic composition, either a polymer, monomer, or a solution of polymer in monomer. The coating must be capable of being cured by high energy radiation. Polymerizable organic compositions which may be used include: polymers of acrylate esters, epoxy-acrylates, vinyl esters, unsaturated polyesters, and solutions of the aforementioned polymers in monomers of a similar type. Specifically, unsaturated polyesters such as condensates of propylene glycol, maleic anhydride and phthalic anhydride dissolved in styrene, methyl methacrylate or mixtures of these monomers; epoxy-acrylates such as those sold under the trademark Epocril E-11, or solutions of these resins in styrene or acrylate ester monomers; acrylic monomer-polymer syrups such as poly-n-butylmethacrylate dissolved in monomeric n-butyl methacrylate; monomers such as vinyl acetate, vinyl pyrrolidone, ethyl acrylate, ethylene dimethyacrylate, and mixtures of, these, may be used.

Polylite 8183 (trademark of Reichhold Chemicals, Inc., White Plains, N.Y.) and Stypol 40–2224 (trademark of Mattenson-Van Way, Inc.) are typical of many commercially available polyester resins intended for premix molding in similar applications. They are generally solutions of a phthalic-maleic-ethyleneglycol alkyd resin in vinyl toluene. A typical composition would be 70% alkyd resin and 30% vinyl toluene. These are generally classed as semi-rigid resins when polymerized. Such solutions are typical of those useful as the liquid coating material in this invention.

An atmosphere of polymerizable monomer above the coating composition must be maintained during curing of the coating composition to prevent inhibition of polymerization on the surface of the coating by oxygen. The polymerizable monomer may be mixed with suitable amounts of an inert gas, such as helium, argon, or nitrogen, if desired. The monomer used is preferably different from that in the coating composition, although they may be the same. The monomer should have some appreciable solubility in the coating composition, at least sufficient solubility to modify the surface properties of the coating composition. A mixture of monomers may be used, if desired. Exemplary of monomers which may be used include, particularly, vinyl monomers, such as ethylene, propylene, butadiene, vinyl chloride, vinyl fluoride, vinylidene chloride, vinylidene fluoride, vinyl acetate, vinyl propionate, acrylonitrile, styrene, acrylic and methacrylic esters, and vinyl ethers. The amount of polymerizable monomer used is dependent on the particular surface coating used, the particular monomer employed, and the properties of the cured coating desired. The vapor pressure of the monomer atmosphere may be controlled above or below atmospheric pressure in order to regulate the amount of monomer which dissolves in the surface coating and at the same time regulate the amount of surface modification of the coating composition.

Temperatures which may be used are limited only by the stability of the substrate and the stability and volatility of the liquid coating. Generally, temperatures ranging from 0 to 100° C., and preferably 15 to 80° C. are adequate.

High energy ionizing radiation, either particulate or electromagnetic, may be employed. Thus, the emission of highly accelerated electrons or nuclear particles, such as protons, neutrons, alpha particles, deuterons, beta particles, directed at the surface coating, are effective. The particles may be accelerated to high speeds by any number of known means, such as a cyclotron or Van de Graaff generator. Effective results have been obtained, for example, using high energy electrons of from 20,000 to 10,000,000 electron volts emitted from a Van de Graaff generator. The dose should be sufficient to cure the surface coating to a firm, non-tacky film. Dose rates up to 10 megarads per second may be used. In particular, when using electron beam radiation, dose rates of from 1 megarad per minute to 10 megarads per second may be employed.

Utilizing the process of this invention, coatings can be tailored to meet a substantial number of desired uses. For example, a tough flexible polyester substrate coating onto which is graft polymerized an acrylic ester surface coating, gives the coating hardness and scratch resistance. Also, a polyester or acrylic surface coating with appreciable water tolerance can be modified with vinyl chloride to impart improved moisture resistance to the coating surface. Such surface modifications are highly desirable in many commercial uses today.

The following examples are intended to be illustrative of the invention and not limiting in any manner.

Example I

A 2 x 3 x ¼" piece of birchwood was coated with a thin layer of a polyester sold under the trademark Polylite 8183 (Reichhold Chemicals, Inc.). The coated birchwood was then placed coating side up in a glass jar equipped with a gas inlet tube running to the bottom, an outlet tube near the top, and a cover of thin polyethylene film held tight with a flange. Vinyl chloride gas was swept through the container for five minutes. The vessel was then passed under a 2 mev. electron beam of a Van de Graaff generator at a rate such that a dose of 2 megarads was delivered. On removing a sample, the coating was found to be hard and non-tacky.

A similar coated sample cured identically in the air had a surface that was tacky to the touch.

Example II

The above experiment was repeated using lauan veneer and vinylidene fluoride gas. The cured coating was tack-free.

Example III

A 2 x 6 x ¼" piece of birch plywood was coated with a polyester sold under the trademark Stypol 40–2224 (Mattenson-Van Way, Inc.). The coated sample was placed face up in a brass box equipped with a gas inlet and thin brass sheet cover held on with a flange. The box was evacuated for 1½ minutes and then filled with vinyl chloride at 36 p.s.i. While still under pressure, the apparatus was passed four times under a 2 mev. Van de Graaff generator at 0.5 megarad per pass. After removal from the brass box, the panel had a smooth, tack-free coating.

A similar coated sample cured with a covering film of polyethylene terephthalate exhbited more brittle properties than film cured according to the present invention in that a mild hammer blow cracked the formed while not cracking the latter. In addition the surface of the film cured according to Example III was both resilient and non-tacky.

Having described my invention, what I claim is:

1. The process of coating a surface of a substrate with an organic polymer material and curing the material to a tack-free condition by means of high energy radiation, which comprises:
   (1) coating the surface with a liquid polymerizable organic composition,
   (2) replacing substantially all of the oxygen in the atmosphere surrounding the coating with an atmosphere comprising a polymerizable monomer wholly in the vapor phase, and
   (3) exposing the coating to high energy radiation sufficient to cause polymerization of said liquid polymerizable organic composition as a substrate coating and graft polymerization of the vapor phase monomer onto the substrate coating, whereby a firm, tack-free surface having improved surface characteristics is obtained.

2. Process according to claim 1 wherein the liquid polymerizable organic composition is one selected from the group consisting of monomers, polymers, and mixtures thereof, curable by high energy radiation.

3. Process according to claim 2 wherein the liquid composition is selected from the group consisting of acrylate esters, epoxy-acrylates, vinyl esters and unsaturated polyesters.

4. Process according to claim 1 wherein the polymerizable monomer comprises a vinyl monomer.

5. Process according to claim 1 wherein the monomer and the liquid polymerizable coating composition are not the same.

6. Process according to claim 4 wherein the vinyl monomer is selected from the group consisting of styrene, ethylene, propylene, vinyl chloride, vinylidene chloride, vinyl acetate, vinyl fluoride, vinylidene fluoride, acrylonitrile, methacrylonitrile, butadiene, and acrylate esters.

7. Process according to claim 1 wherein the atmosphere surrounding the coating includes an inert gas.

8. Process according to claim 1 wherein the high energy radiation ranges from about 20,000 to 10,000,000 electron volts.

9. A process of coating a surface of a substrate with an organic polymer material and curing the material to a tack-free condition by means of high energy radiation which comprises:
   (1) coating the surface with a liquid unsaturated polyester composition,
   (2) replacing substantially all of the oxygen in the atmosphere surrounding the coating with an atmosphere of a polymerizable vinyl monomer wholly in the vapor phase, the monomer having sufficient solubility in the coating to modify the surface properties thereof, and
   (3) exposing the coating to high energy electrons ranging from 20,000 to 10,000,000 electron volts to cause polymerization of the liquid unsaturated polyester composition substrate coating and graft polymerization of the vapor phase monomer onto the substrate coating.

References Cited

UNITED STATES PATENTS

| | | | |
|---|---|---|---|
| 2,959,899 | 10/1960 | Cline | 117—93.31 X |
| 2,999,772 | 9/1961 | Burk | 117—106 X |
| 3,046,072 | 7/1962 | Salsbury | 117—106 X |
| 3,077,417 | 2/1963 | Kenaga | 117—93.31 X |
| 3,107,206 | 10/1963 | Cottet | 117—93.31 X |
| 3,111,424 | 11/1963 | Clair | 117—93.31 X |
| 3,113,896 | 12/1963 | Mann | 117—93.31 X |
| 3,119,707 | 1/1964 | Christy | 117—106 X |
| 3,188,165 | 6/1965 | Magat | 117—93.31 X |
| 3,188,228 | 6/1965 | Magat | 117—93.31 X |

WILLIAM D. MARTIN, Primary Examiner

W. R. TRENOR, Assistant Examiner

U.S. Cl. X.R.

117—93.31, 106, 132, 148, 155; 204—159.15